US010144275B2

(12) United States Patent
Gaddis et al.

(10) Patent No.: US 10,144,275 B2
(45) Date of Patent: Dec. 4, 2018

(54) ENVIRONMENTAL CONTROL IN VEHICLES (71) Applicant: INTERNATIONAL BUSINESS MACHINES CORPORATION, Armonk, NY (US)

(72) Inventors: Cynthia H. Gaddis, Chicago, IL (US); Kelly Malone, Middleton, MA (US); Xinlin Wang, Irvine, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/255,388

(22) Filed: Sep. 2, 2016

(65) Prior Publication Data

US 2018/0065453 A1 Mar. 8, 2018

(51) Int. Cl.
B60J 3/04 (2006.01)
G02F 1/01 (2006.01)

(52) U.S. Cl.
CPC .............. B60J 3/04 (2013.01); G02F 1/0121 (2013.01); G02F 1/0126 (2013.01); G02F 1/0147 (2013.01)

(58) Field of Classification Search
CPC ........................................................ B60J 3/04
See application file for complete search history.

(56) References Cited

U.S. PATENT DOCUMENTS 6,084,702 A    7/2000  Byker et al.
7,300,167 B2  11/2007  Fernando et al.
8,482,834 B2   7/2013  Cordova
8,781,676 B2   7/2014  McIntyre, Jr. et al.
2011/0102878 A1* 5/2011 McCarthy .............. G02B 5/208
                                                          359/288
2011/0163866 A1* 7/2011 Ghannam .................. B60J 3/04
                                                          340/449
2014/0118812 A1  5/2014  Olenick
2014/0160550 A1* 6/2014  Brown ................ H04L 12/2803
                                                          359/275
2015/0253594 A1  9/2015  Roberts et al.

FOREIGN PATENT DOCUMENTS

JP    2008222045 A  *  9/2008

OTHER PUBLICATIONS

JP2008222045A—English translation (Sep. 2008).*
IBM, "Apparatus and Method for Blocking Sunlight Using LCD Windows on a Car in Conjunction with GPS and Thermometer," An IP.com Prior Art Database Technical Disclosure, IP.com No. IPCOM000146517D, Feb. 15, 2007 (3 pages).

* cited by examiner

Primary Examiner — Anne M Antonucci
Assistant Examiner — Renee LaRose
(74) Attorney, Agent, or Firm — Griffiths & Seaton PLLC (57) ABSTRACT Embodiments for environmental control of a vehicle by a processor. An environmental change in the vehicle is predictively anticipated by monitoring at least one environmental factor over time. In response to the predicted environmental change, a physical change is caused in a constituent portion of an assembly inclusive of an external surface of the vehicle, which when activated compensates for the predicted environmental change.

18 Claims, 9 Drawing Sheets

ENVIRONMENTAL CONTROL IN VEHICLES

BACKGROUND OF THE INVENTION

Field of the Invention

The present invention relates in general to computing systems, and more particularly to, various embodiments for implementing predictive analytics to adjust an interior climate in a vehicle by a processor.

Description of the Related Art

Vehicles of every kind, size, energy consumption, and more currently driven or so called "driverless vehicles" are prevalent in every aspect of today's society, as people are more mobile today than likely at any time in recorded history. Attendant with the proliferation of vehicles have been certain negative environmental impacts associated with being an occupant in a vehicle that is exposed to the elements, particularly if an individual or animal becomes trapped inside. As one of ordinary skill in the art will appreciate, the interior environment of vehicles may act as a "mini-greenhouse" of sorts as solar radiation penetrates through the vehicle surfaces and the ambient air inside. Because of the inherent nature of vehicles (e.g., having a large amount of surface area exposed as glass surfaces, for example), the interior environment of a vehicle may change rapidly depending on changes in the external environment.

SUMMARY OF THE INVENTION

Various embodiments for environmental control of a vehicle by a processor, are provided. In one embodiment, by way of example only, a method for environmental control of a vehicle by a processor is provided. An environmental change in the vehicle is predictively anticipated by monitoring at least one environmental factor over time. In response to the predicted environmental change, a physical change is caused in a constituent portion of an assembly inclusive of an external surface of the vehicle, which when activated compensates for the predicted environmental change.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously indicated, use of vehicles for mobility of persons, animals (e.g., pets) and the like are increasingly proliferating. Many people spend more of their daily routine in their vehicles for work, for commuting, or for play. Accordingly, the interior environment of vehicles also plays a greater part in people's affairs. In addition, a greater number of people choose to travel with animals, such as the family pet. With the increasing use of vehicles of every kind has come an increase in vehicle environment-related incidents, such as injury or deaths due to heat exhaustion by persons or animals that become trapped in vehicles.

There have been efforts, both social and technical, to address the environmental-related vehicle hazards. In addition, socially, information has been disseminated to address behavioral changes and best practices to prevent vehicle environment-related injuries or fatalities. Notwithstanding these efforts, a need remains to reduce, prevent, or otherwise address vehicle environment-related hazards.

The mechanisms of the illustrated embodiments, as will be further described, take a proactive approach to vehicle environmental control, and implement, among other aspects, predictive intelligence in vehicle monitoring techniques, adjustment of environmental controls, and as will be further described, reduction and/or minimization of solar radiation through vehicle surfaces, such as Ultra Violet (UV) radiation through a vehicle's window glass. Reduction and/or minimization of the passivity of the solar radiation through the vehicle's surfaces then reduces reflectance of the radiation once inside the vehicle's interior environment, thus reducing the greenhouse effect that typically occurs when vehicles are exposed to the sun.

Accordingly, the mechanisms of the illustrated embodiments make use of predictive analytics to, among other aspects, predict the internal environmental changes, such as temperature changes, of the interior environment. For example, the mechanisms may correlate to the rate of change of the incidence of UV light on an external sensor device. In addition to initiating environmental controls within the car, the mechanisms of illustrated embodiments propose to reduce the impact of incident light (again, such as UV incident light) on the internal temperature of the vehicle.

Two example embodiments are provided for solutions to vary the passivity of solar radiation through vehicle surfaces, such as window glass. In a first example, the mechanisms of the illustrated embodiments implement a thermochromic material embedded within the glass matrix assembly of the window. In the case of implementing the thermochromic material, as the environmental controls in the vehicle are initiated (e.g., air conditioning, setting internal circulation), a signal may be provided to certain heating elements that are also embedded in the glass matrix assembly, causing the thermochromic material to change to a state (e.g., color) that is reflective of the solar radiation (such as UV reflective). Given that the heating element may be structured in various patterns, the shading of the window by the thermochromic material may be controlled and manipulated.

In an alternative example, the mechanisms of the illustrated embodiments implement a photochromic material, which also may be embedded in the vehicle glass assembly. The presence of certain solar radiation (here again such as UV rays) may then trigger the initiation of a change in state/color of the photochromic material, which may also be UV reflective, for example. Additionally, certain environmental controls (air conditioning, internal circulation, and so forth) may also be initiated when the presence and/or amount of certain solar radiation is detected, which causes a prediction of internal temperature to exceed a given threshold.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
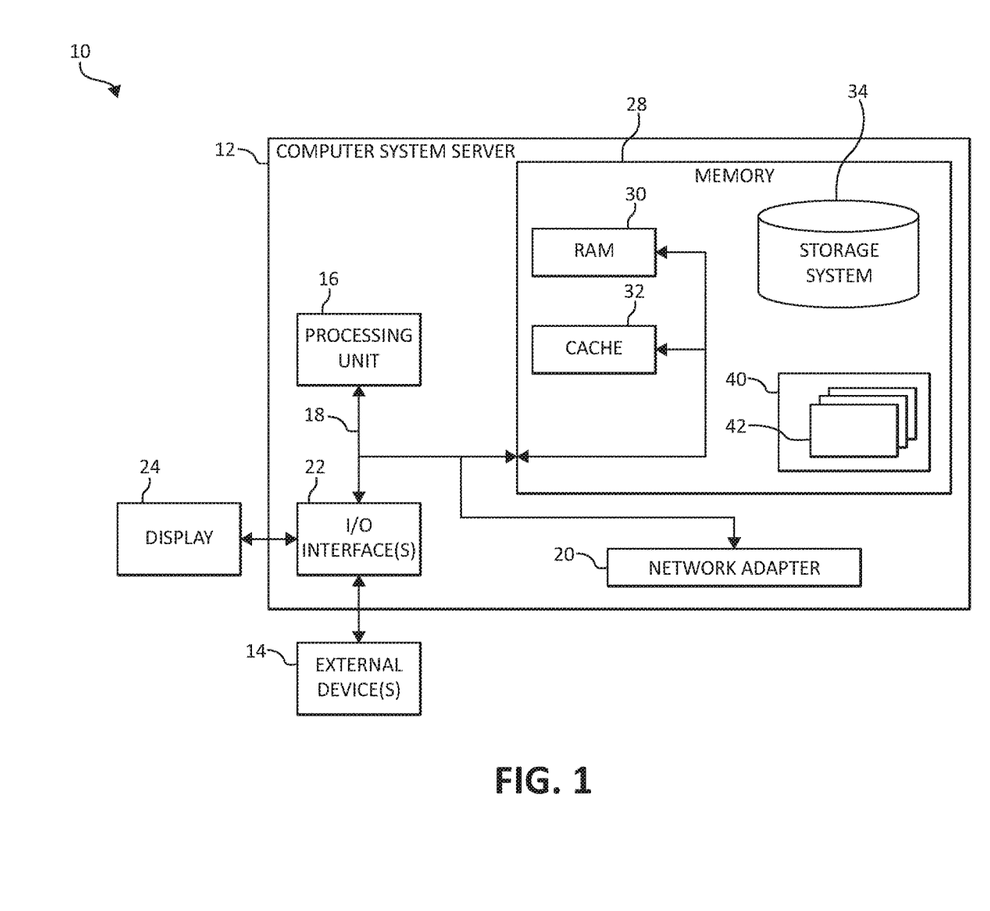
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
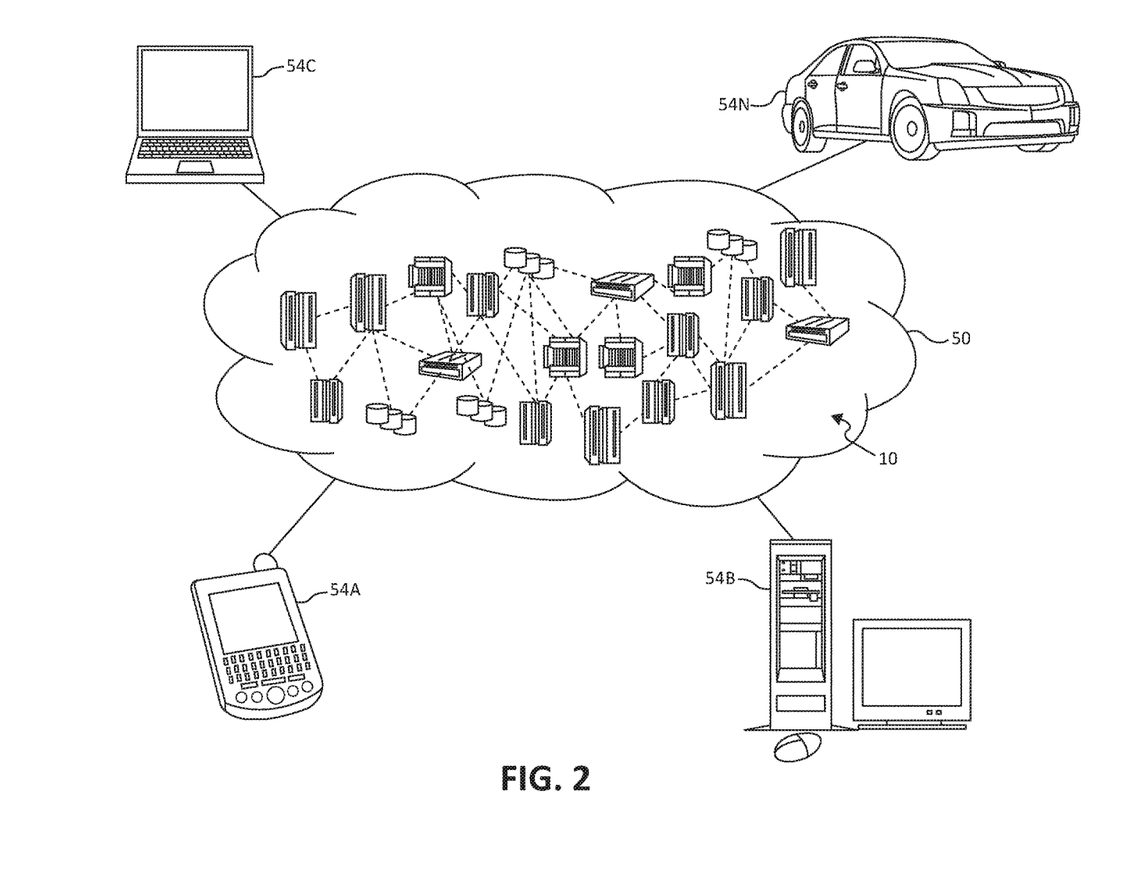
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
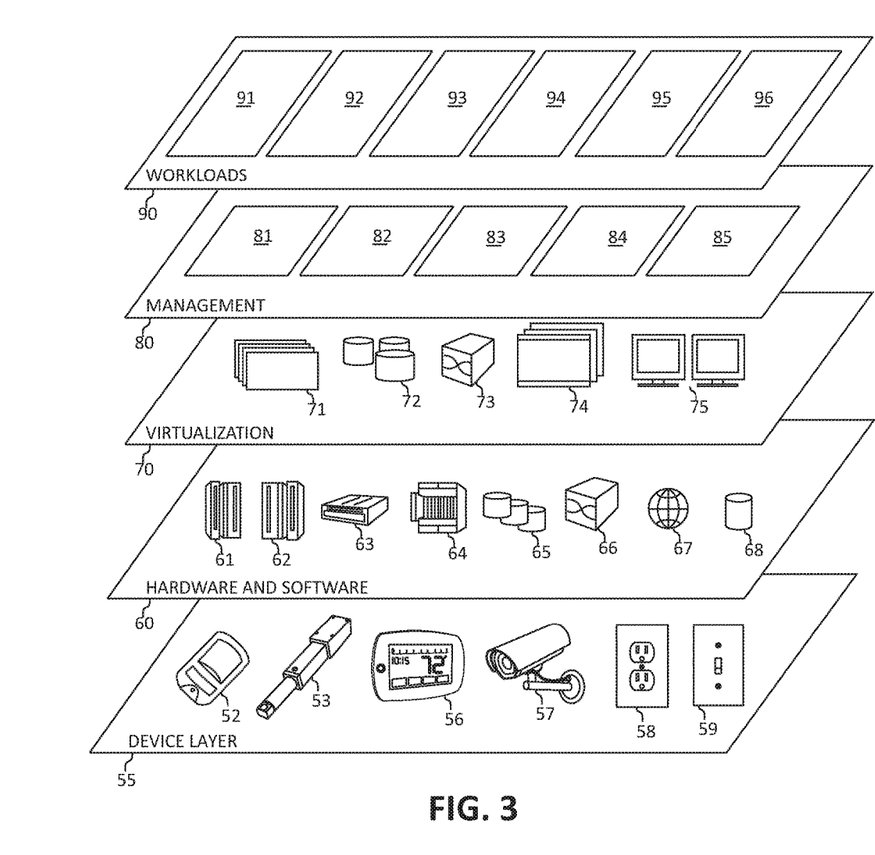
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various vehicle monitoring and environmental control workloads and functions 96. In addition, vehicle monitoring and environmental workloads and functions 96 may include such operations as data analysis (including data collection and processing from various environmental sensors), and predictive data analytics functions. One of ordinary skill in the art will appreciate that the vehicle monitoring and environmental control workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for monitoring environmental factors of a vehicle's interior, combined with predictive intelligence to activate materials that reduce passivity of solar radiation through the vehicle's surfaces. In one embodiment, as previously indicated, the vehicle's window glass matrix may be embedded with photochromic or thermochromic materials that enhance radiation reflectivity/reduce passivity when activated.

Figure 4:
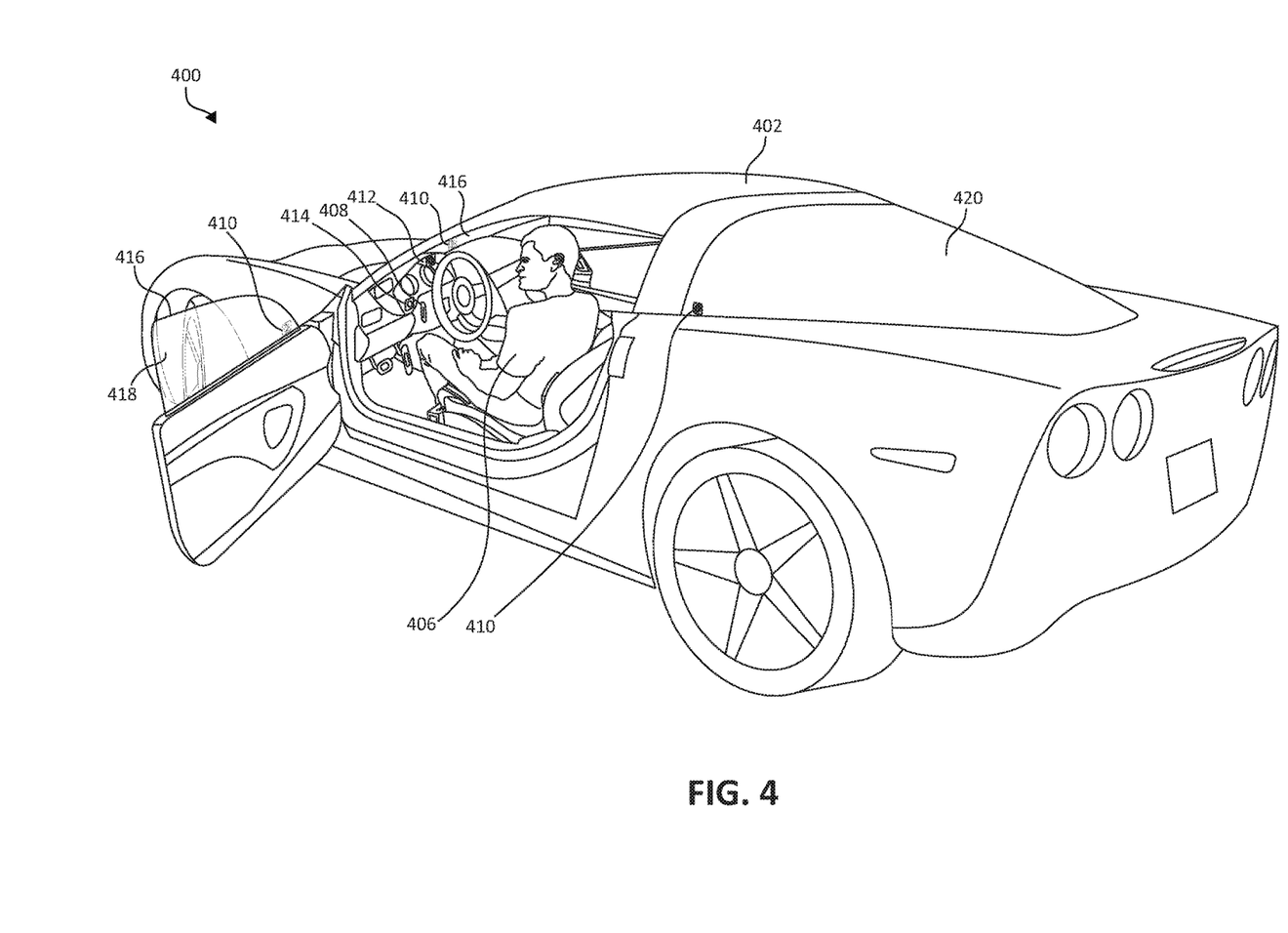
FIG. 4 is an additional block diagram depicting various user hardware and computing components functioning in accordance with aspects of the present invention.

Turning to FIG. 4, a block diagram of various hardware 400 including a vehicle 402 equipped with various functionality as will be further described is shown in which aspects of the mechanisms of the illustrated embodiments may be realized. Vehicle 402 is driven by an individual 406. A variety of environmental sensor devices may be installed in or around the vehicle 402, such as biometric sensors, cameras 412 (including UV/thermal cameras and the like), audio input devices such as a microphone 414, and other sensor devices to record a wide variety of environmental data input.

Notwithstanding the aforementioned sensors, the depicted embodiment features a thermometer 408 to monitor an internal temperature of the vehicle, and several externally mounted UV sensors 410, for example and as shown mounted to each window of the vehicle 402. For example, a UV sensor 410 is shown mounted to a corner of the vehicle's windshield 416 and an additional UV sensor 410 is shown mounted to a side window 418 and rear window 420.

In one embodiment, the various environmental sensors associated with the vehicle 402 are monitored over time (e.g., in real time over a period of time). Certain data may be obtained from the respective sensor devices, such as internal temperature from the thermometer 408, visible or thermal cues from the camera 412 such as surface temperatures inside the interior environment and/or surface temperatures of the driver 406, auditory cues from the microphone 414 (e.g., patients breathing or statements). In this manner, the sensors perform a data collection aspect that may include various data collection activities associated with one or more occupants of the vehicle to make determinations as to the occupant's current level of comfort, and based on real time feedback, whether the occupant's comfort has improved after various adjustments. These determinations may, in part, be obtained by using biometric information from the occupant(s) such as facial expressions, body temperature, breathing, other visual and auditory cues, heart rate, and so forth.

In one embodiment, each of the sensors 408, 410, 412, 414, and so forth may be in communication with the computer system/server 12 (FIG. 1) to effect data processing, data collection, computational, and other tasks. Computer system/server 12 may incorporate onboard data storage capabilities, storing temperature or other environmental information, data modeling, data analytics, predictive operations, and the like. In addition, and as previously indicated, computer system/server 12 may be connected to other computing nodes over a distributed computing network, where additional data collection, processing, analytics, and other functionality may be realized.

The computer system/server 12, or other related components may correlate/predict internal temperature of the vehicle 402 based on a number of possible mechanisms. For example, the processing component 12 may develop a heating model that is tailored for a particular vehicle (e.g., based on the amount of the interior exposure of the vehicle through the vehicle's total glass surface area) that models a rate of change for solar radiation (including UV radiation). In addition, the processing component 12 may predict internal temperatures of the vehicle by finding/fitting an algorithm corresponding to the appropriate model that correlates solar radiation to the measured temperature in an original data set. One of ordinary skill in the art will appreciate that additional factors, such as the vehicle's geographical position, time of day, time of year, surface upon which the vehicle is traveling and/or resting, elevation, and other factors may be observed and/or determined from vehicle sources or sources available through the distributed computing environment that may be used to develop a more accurate algorithm representative of the environmental behavior of the interior of the vehicle at a certain time/place.

Along with the predictive analysis mentioned previously, the various mechanisms of the illustrated embodiments may implement certain environmental controls if one or more thresholds are exceeded. For example, if a weight sensor indicates that a child is in a car seat, thresholds for temperatures may be set lower than the temperatures may be set for a healthy adult. If the real-time data collection from the various environmental sensors (for example, temperature obtained from the internal environment) exceeds the threshold(s), various alarms (audible, digital notification to an adult, EMS) may be triggered, and various environmental controls inside the car may be triggered as will be further described.

In one embodiment, for example, either a photochromic or thermochromic material may be activated to limit solar radiation passivity as a part of these environmental control activities. In those embodiments inclusive of reactive materials, a reflective metal barrier will then automatically form inside the glass matrix of the window as the solar radiation change overcomes the reaction energy barrier (which is lower than the adverse temperature prediction triggering the environmental controls).

In another embodiment, for example, the reactive photochromic or thermochromic material may be applied to a layer as part of the vehicle's paint process, or another vehicle assembly that incorporates an external surface of the vehicle that receives solar radiation. One of ordinary skill in the art will appreciate that use of reactive materials to solar radiation may be incorporated to a wide variety of vehicle surfaces.

Figure 5A:
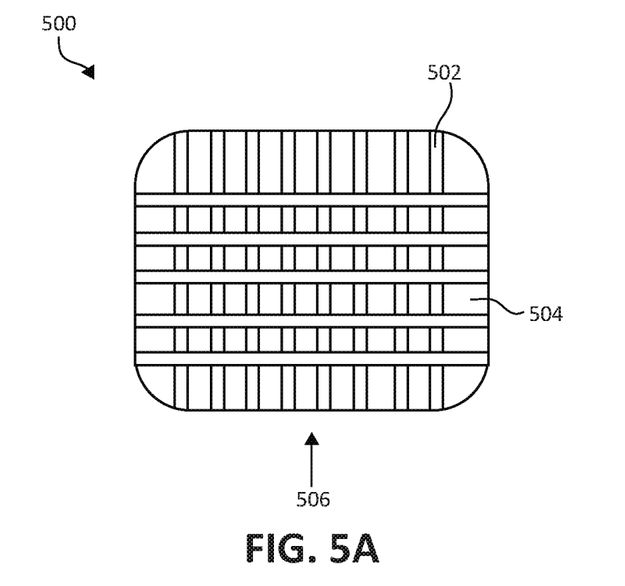
FIG. 5A is a block diagram of exemplary hardware structures when used in combination with the processing components of the present invention, effecting various mechanisms of the illustrated embodiments.

Turning now to FIG. 5A, an exemplary window assembly 500 is shown incorporating a heating grid with conductive elements 502 that are crisscrossed in a controllable pattern (e.g., some of the conductive elements 502 may be activated while others remain inactive) that is in thermal communication with the thermochromic material 504 embedded in the vehicle glass assembly shown by a front view designated by reference arrow 506.

Accordingly, the environmental controls in the vehicle may activate the heating grid conductive elements 502 in a variety of scenarios (such as when a monitored environmental threshold is triggered, or when an external radiation sensor determines that the vehicle's glass is directly facing the sun/is receiving a corresponding high level of solar radiation).

Figure 5B:
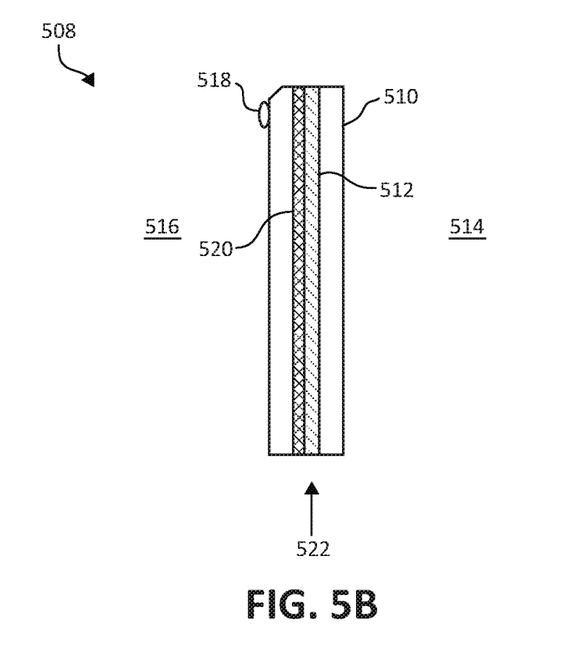
FIG. 5B is an additional block diagram of various hardware structures to effect various mechanisms of the illustrated embodiments.

FIG. 5B as designated by reference arrow 522 depicts a side view of a window assembly 510 in an environmental control mode of operation 508, with side 516 representative of the external environment of the vehicle, and side 514 representative of the inside environment of the vehicle. Here the radiation sensor 518 has detected a level of solar radiation higher than a set threshold, activating the thermochromic material 520 by placing an electrical charge on the heating grid 512. As the heating grid 512 warms, the thermochromic crystals darken to reduce the passivity of the solar radiation through the window assembly 510.

Figure 6A:
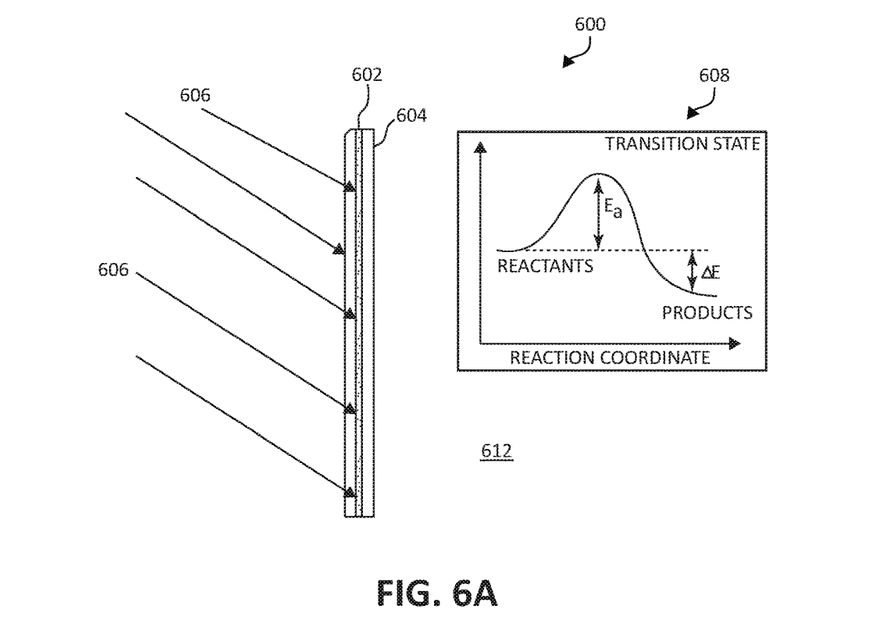
FIG. 6A is an additional block diagram of an exemplary illustration of permeability of solar radiation through window glass among other aspects of the present invention.
Figure 6B:
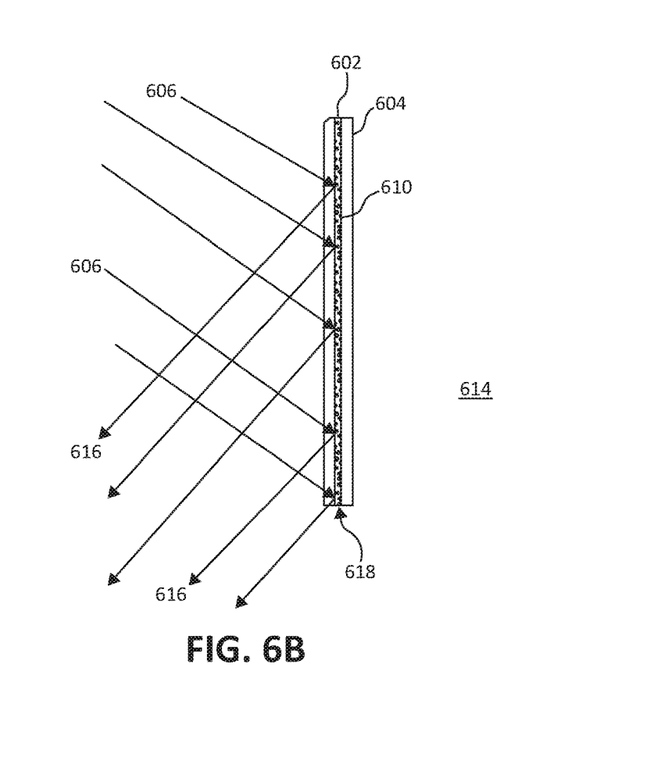
FIG. 6B is an additional block diagram of an exemplary illustration of a reflection of solar radiation using an embedded photochromic or thermochromic material according to various aspects of the illustrated embodiments.

FIGS. 6A and 6B, following, further illustrate various aspects of exemplary functionality 600 of using reactive materials embedded in or otherwise associated with vehicle surface assemblies as shown. Beginning with FIG. 6A, a photochromic material 602 is disposed within a vehicle glass assembly 604. The interior environment of the vehicle is referenced by 612 as shown. The glass assembly 604 is then subjected to sunlight, as represented by the various UV rays 606. To further illustrate the transition state of the reactive material to the solar radiation, a reaction diagram 608 details changes in energy as the reactive material absorbs the UV rays 606. To cause a transition state, the energy supplied by the change in incident UV light is required to overcome a reaction energy barrier. When the transition state is overcome, a smart/reversible layer of photo-responsive metal ions form 610 which then increases UV reflectivity, as shown further in FIG. 6B, following.

Here in FIG. 6B, which again shows a portion of the glass assembly 604 now with an interior environment 614 undergoing environmental control operations, the UV rays 606 are entering the glass assembly 604, where they encounter the photochromic layer 602 that has overcome a transition state and has formed products which are reflective as designated by 618. As a result, the UV rays 606 are reflected away as reflected UV rays 616 and the internal temperature of the vehicle is controlled.

Figure 7:
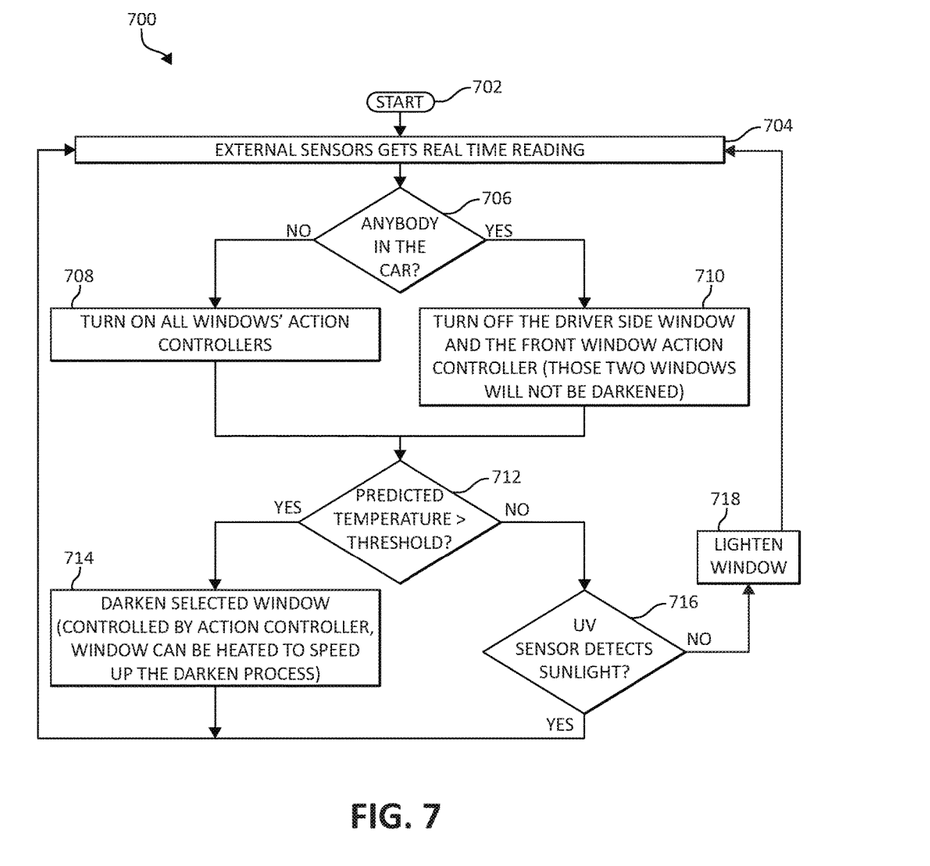
FIG. 7 is a flowchart diagram of an exemplary method for predictive control of internal environments in a vehicle by a processor, in which various aspects of the present invention may be realized.
Figure 8:
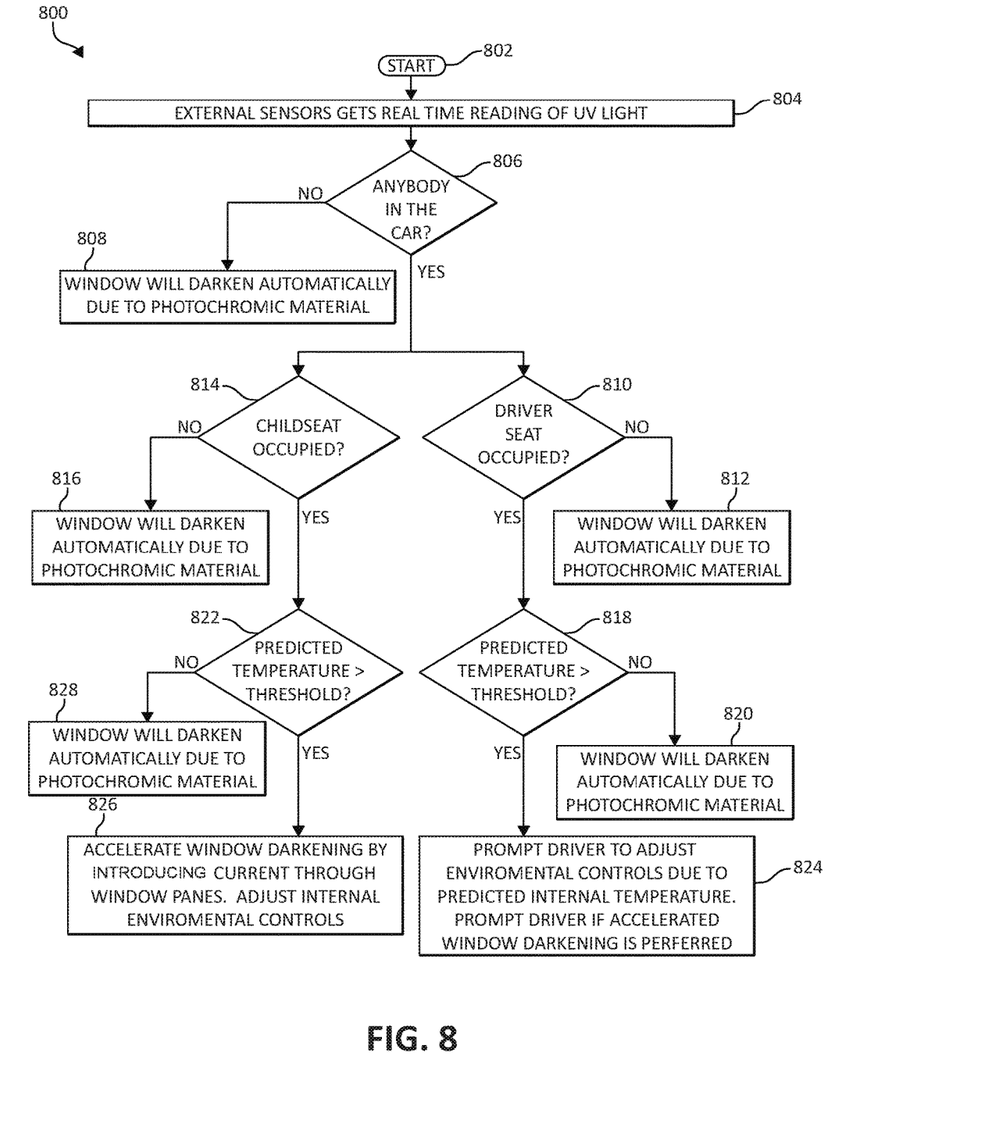
FIG. 8 is an additional flowchart diagram of an additional exemplary method for predictive control of internal environments in a vehicle by a processor, here again in which various aspects of the present invention may be realized.
Figure 9:
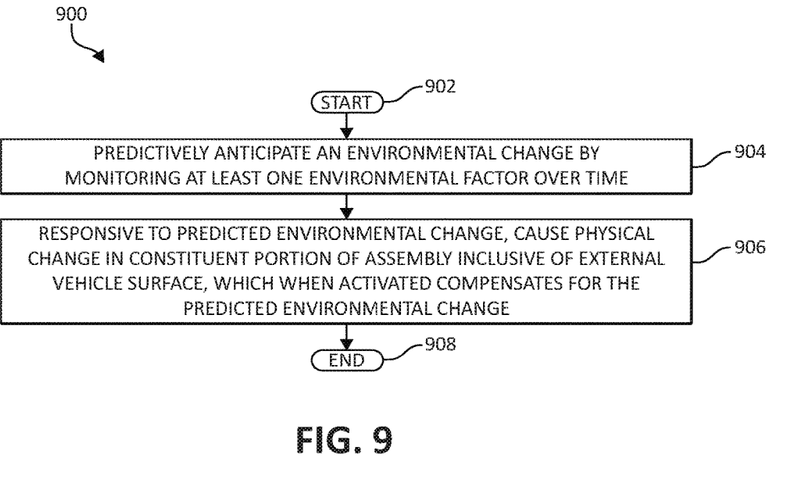
FIG. 9 is an additional flowchart diagram of an additional exemplary method for predictive control of internal environments in a vehicle by a processor, here again in which various aspects of the present invention may be realized.

FIGS. 7, 8, and 9 are now herein presented as exemplary method embodiments for environmental control of a vehicle. The various steps in the methods may, as one of ordinary skill in the art will appreciate, be executed by processing components located on the vehicle, in a distributed computing environment (such as computer server/processor 12), or other hardware and/or software components as previously described.

Turning now to FIG. 7, a flowchart diagram of an exemplary method 700 for predictive analytical control of a vehicle's interior environment is depicted, in which various aspects of the present invention may be realized. In the present embodiment, various actions are performed on thermochromic materials embedded in the vehicle's glass assembly structures (e.g., windows) as previously described. Method 700 begins (step 702) with the gathering of environmental data from various vehicle sensors (step 704). For example, external solar radiation (e.g., UV) sensors may detect, in real-time, the strength of particular solar radiation on a particular vehicle glass assembly, such as the front windshield of the vehicle, and thereby model the passivity of the radiation through the assembly and the environmental effect (e.g., a prediction of a certain temperature at a certain subsequent time).

A subsequent decision step 706 queries whether any persons (or animals) are in the vehicle. The determination of an individual's presence in the vehicle may be obtained from a wide variety of sensory devices placed inside the vehicle as previously described, such as a weight sensor, camera movement, visual or audio cues. If the presence of a living thing is not detected, the control activities upon any of the vehicle's windows are enabled (step 708).

Returning to decision step 706, if the presence of an individual or animal is detected (in the present embodiment, a driver of the vehicle is determined to be present in the vehicle's interior), the driver side window and front window action controller devices are disabled (step 710). As a result, the windshield and driver side window is not activated/darkened.

The method 700 then continues to monitor various environmental information in real-time. If, in decision step 712, based on various sensory information, the predicted temperature is determined to exceed a predetermined threshold (e.g., a preset threshold may be established warranting an action if the temperature is predicted to climb ten degrees Fahrenheit in 10 minutes of time, although one of ordinary skill will appreciate that the preset threshold may vary in a variety of scenarios and implementations), the method 700 moves to step 714 to activate the reactive materials embedded within the windows to darken the windows and increase reflectivity/lower transmissivity of the radiation through the window. The window action controller may initiate the darkening process. In one embodiment, an embedded heating grid may be activated to accelerate the darkening process of the reactive thermochromic material.

Returning to decision step 712, if the predicted threshold is not yet exceeded, but the external radiation sensor(s) detect a sufficient strength of sunlight (decision step 716), the method 700 returns to step 704 to continue monitoring/collecting sensor information in real time. If, in decision step 716, sunlight is not detected (e.g., the driver has pulled the vehicle into his garage), the reactive material is deactivated, and the window is lightened (step 718).

FIG. 8 is an additional flowchart depicting an additional exemplary method 800 for predictive environmental control of a vehicle based on various sensory information obtained from the vehicle over time. In the depicted embodiment, photochromic material is embedded in the vehicle glass assemblies in similar fashion to the thermochromic material implemented in method 700 previously. Method 800 begins (step 802) with the collection of solar radiation information from the external sensors as previously described (step 804).

If any persons or animals are not detected (decision step 806), the applicable window assemblies are darkened automatically in the presence of solar radiation due to the embedded photochromic material.

Returning to decision step 806, if person(s) or animal(s) are detected in the vehicle, the method 800 moves to decision steps 810 and 814, which query whether the driver's seat is occupied (again determined by various sensor information) and whether a child safety seat is occupied, respectively. If the driver's seat is not occupied, or if the child safety seat is not occupied, the vehicle's windows darken automatically due to the photochromic material (steps 812 and 816, respectively).

If the driver's seat is determined to be occupied, or the child safety seat is occupied (again decision steps 810 and 814, respectively) decision steps 818 and 822 query whether one or more predicted environmental thresholds (such as temperature) are exceeded. If no, the windows again automatically darken to the presence of the photochromic material (step 820). If yes, the driver is prompted to adjust environmental controls of the vehicle (step 824) due to predicted internal environmental conditions. The driver is also prompted if they wish to accelerate the activation of the reactive material to accelerate the environmental compensation provided by the increase in radiation reflectivity/lower transmissivity. Finally, if the child safety seat is occupied and the predicted environmental condition(s) are determined to exceed the threshold, the window activation is automatically accelerated by introducing a current through the embedded heat element. Various internal environmental controls may also be adjusted to assist in bringing the vehicle's internal environment under control in the presence of the solar radiation.

Turning now to FIG. 9, an additional flowchart of an exemplary method for environmental control of a vehicle is depicted, here again in which various aspects of the present invention may be realized. Method 900 begins (step 902) by predictively anticipating an environmental change (e.g., temperature rise) by monitoring at least one environmental factor (e.g., solar radiation level on external radiation sensor(s)) over time (step 904).

In a subsequent step 906, responsive to the predicted environmental change determined to exceed a preset threshold, a physical change is caused in a constituent portion of an assembly inclusive of an external surface of the vehicle, which when activated compensates for the predicted environmental change. The methods ends (step 908).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for environmental control of a vehicle by a processor, comprising:
predictively anticipating an environmental change in the vehicle by monitoring at least one environmental factor over time by the processor through use of an environmental sensor inside the vehicle, the processor correlating a rate of change of an incidence of the at least one environmental factor on the environmental sensor and using the rate of change to develop a heating model tailored to a particular model of the vehicle based on an amount of interior exposure of the vehicle through the vehicle's total glass surface area to predictively anticipate the environmental change; and
responsive to the predicted environmental change, causing, by the processor, a physical change in a constituent portion of an assembly inclusive of an external surface of the vehicle, which when activated compensates for the predicted environmental change.

2. The method of claim 1, wherein the constituent portion of the assembly is a thermochromic material embedded in a glass assembly of the vehicle, and the thermochromic material is activated to vary a permeation of solar radiation through the vehicle glass assembly.

3. The method of claim 2, further including manipulating a heating mechanism in physical communication with the thermochromic material to accelerate adjustment of the solar radiation permeation through the vehicle glass assembly.

4. The method of claim 1, wherein the constituent portion of the assembly is a photochromic material embedded in a glass assembly of the vehicle, and the photochromic material is activated to vary a permeation of solar radiation through the vehicle glass assembly.

5. The method of claim 1, wherein the environmental sensor is an Ultra Violet (UV) radiation sensor or a thermometer, and monitoring the environmental sensor includes monitoring the UV radiation sensor or the thermometer.

6. The method of claim 1, further including monitoring the predictively anticipated environmental change against a predetermined threshold to trigger activation of the constituent portion when the predetermined threshold is exceeded.

7. A system for environmental control of a vehicle, comprising:
a processor, that:
predictively anticipates an environmental change in the vehicle by monitoring at least one environmental factor over time through use of an environmental sensor inside the vehicle, the processor correlating a rate of change of an incidence of the at least one environmental factor on the environmental sensor and using the rate of change to develop a heating model tailored to a particular model of the vehicle based on an amount of interior exposure of the vehicle through the vehicle's total glass surface area to predictively anticipate the environmental change, and
responsive to the predicted environmental change, causes a physical change in a constituent portion of an assembly inclusive of an external surface of the vehicle, which when activated compensates for the predicted environmental change.

8. The system of claim 7, wherein the surface of the vehicle is a thermochromic material embedded in glass of the vehicle, and the processor, pursuant to activating the surface, causes the thermochromic material to adjust a permeation of solar radiation through the vehicle glass.

9. The system of claim 8, wherein the processor manipulates a heating mechanism in physical communication with the thermochromic material to accelerate adjustment of the solar radiation permeation through the vehicle glass.

10. The system of claim 7, wherein the surface of the vehicle is a photochromic material embedded in glass of the vehicle, and the processor, pursuant to activating the surface, causes the photochromic material to adjust a permeation of solar radiation through the vehicle glass.

11. The system of claim 7, wherein the environmental sensor is an Ultra Violet (UV) radiation sensor or a thermometer, and the processor, pursuant to monitoring the environmental sensor, monitors the UV radiation sensor or the thermometer.

12. The system of claim 7, wherein the processor monitors the predictively anticipated environmental change against a predetermined threshold to trigger activation of the surface when the predetermined threshold is exceeded.

13. A computer program product for environmental control of a vehicle by a processor, the computer program product comprising a non-transitory computer-readable storage medium having computer-readable program code portions stored therein, the computer-readable program code portions comprising:
an executable portion that predictively anticipates an environmental change in the vehicle by monitoring at least one environmental factor over time by the processor through use of an environmental sensor inside the vehicle, the processor correlating a rate of change of an incidence of the at least one environmental factor on the environmental sensor and using the rate of change to develop a heating model tailored to a particular model of the vehicle based on an amount of interior exposure of the vehicle through the vehicle's total glass surface area to predictively anticipate the environmental change; and
an executable portion that, responsive to the predicted environmental change, causes, by the processor, a physical change in a constituent portion of an assembly inclusive of an external surface of the vehicle, which when activated compensates for the predicted environmental change.

14. The computer program product of claim 13, wherein the surface of the vehicle is a thermochromic material embedded in glass of the vehicle, and further including an executable portion that, pursuant to activating the surface, causes the thermochromic material to adjust a permeation of solar radiation through the vehicle glass.

15. The computer program product of claim 14, further including an executable portion that manipulates a heating mechanism in physical communication with the thermochromic material to accelerate adjustment of the solar radiation permeation through the vehicle glass.

16. The computer program product of claim 13, wherein the surface of the vehicle is a photochromic material embedded in glass of the vehicle, and the processor, pursuant to activating the surface, causes the photochromic material to adjust a permeation of solar radiation through the vehicle glass.

17. The computer program product of claim 13, wherein the environmental sensor is an Ultra Violet (UV) radiation sensor or a thermometer, and further including an executable portion that, pursuant to monitoring the environmental sensor, monitors the UV radiation sensor or the thermometer.

18. The computer program product of claim 13, further including an executable portion that monitors the predictively anticipated environmental change against a predetermined threshold to trigger activation of the surface when the predetermined threshold is exceeded.

* * * * *